No. 683,277. Patented Sept. 24, 1901.
B. P. HATCHELL.
PLOW STOCK.
(Application filed Jan. 12, 1901.)
(No Model.) 2 Sheets—Sheet 1.
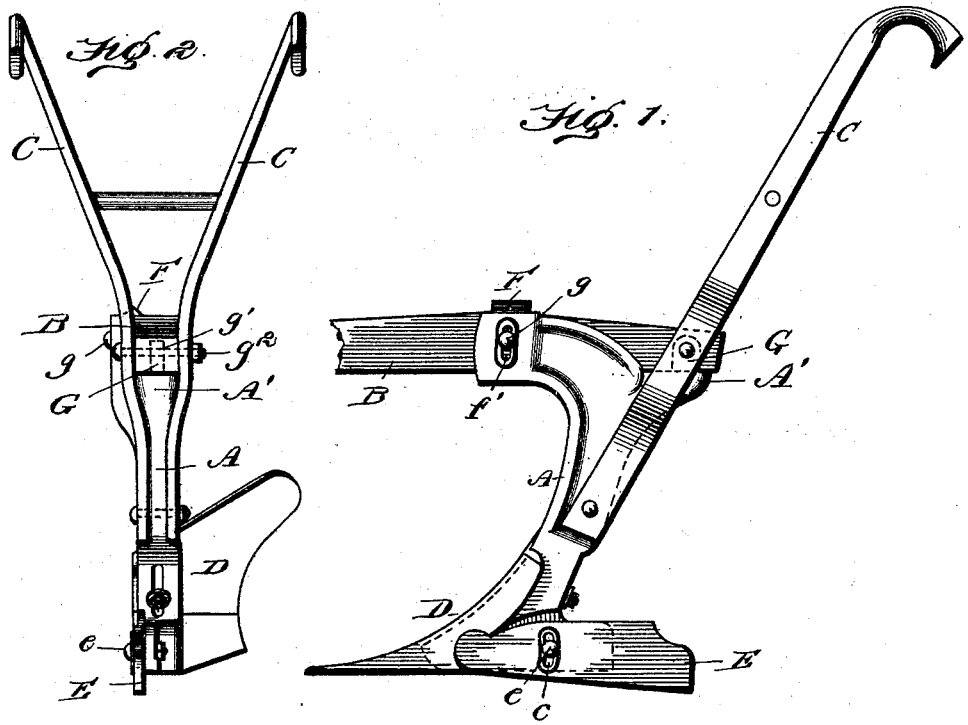
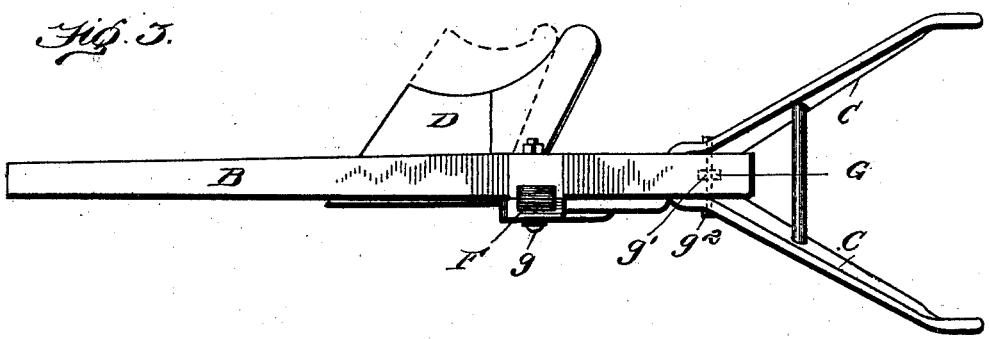

No. 683,277. Patented Sept. 24, 1901.
B. P. HATCHELL.
PLOW STOCK.
(Application filed Jan. 12, 1901.)
(No Model.) 2 Sheets—Sheet 2.
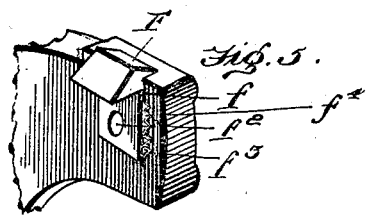
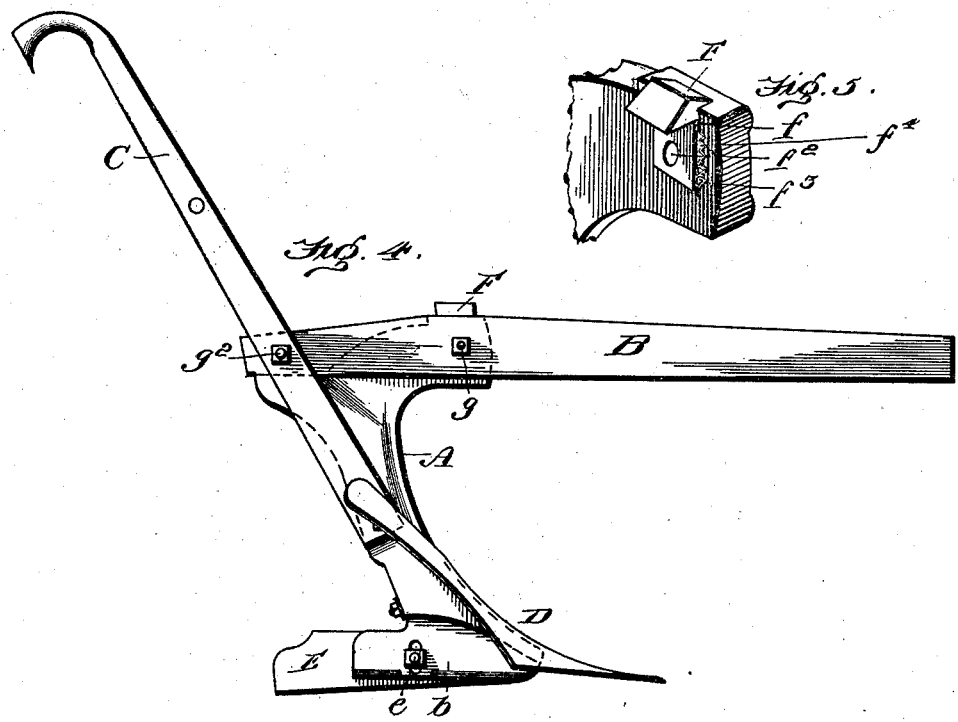
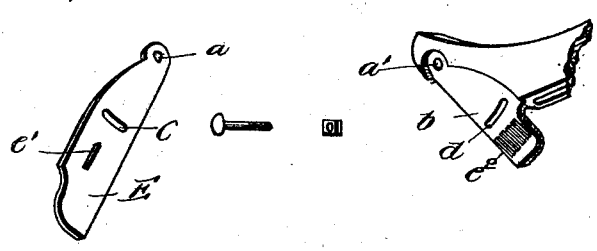
Witnesses
Edwin B. N. Tower, Jr.
W. Perry Hahn.
Inventor
Benjamin P. Hatchell
By Edson Bros,
Attorneys
THE NORRIS PETERS CO., PHOTO-LITHO., WASHINGTON, D. C.

UNITED STATES PATENT OFFICE.

BENJAMIN P. HATCHELL, OF EFFINGHAM, SOUTH CAROLINA.

PLOW-STOCK.

SPECIFICATION forming part of Letters Patent No. 683,277, dated September 24, 1901.

Application filed January 12, 1901. Serial No. 42,995. (No model.)

*To all whom it may concern:*

Be it known that I, BENJAMIN P. HATCHELL, a citizen of the United States, residing at Effingham, in the county of Florence and State of South Carolina, have invented certain new and useful Improvements in Plow-Stocks; and I do hereby declare the following to be a full, clear, and exact description of the invention, such as will enable others skilled in the art to which it appertains to make and use the same.

My invention relates to certain improvements in plows, more especially walking-plows.

It has for its object to cause the plow to penetrate the soil a greater or less extent or degree and to provide for a corresponding angular adjustment of the plow-beam and to otherwise promote convenience and facility of use of the same.

It consists of the detailed construction, combination, and arrangement of parts, substantially as hereinafter more fully disclosed, and specifically pointed out in the claims.

It will be understood that latitude is allowed herein as to details of construction and arrangement of the parts, as they may be varied or changed without departing from the spirit of my invention and the same yet remain intact and be protected.

In the accompanying drawings, illustrating the preferred embodiment of my invention, Figure 1 is a land side elevation thereof. Fig. 2 is a rear view. Fig. 3 is a plan view of the same. Fig. 4 is an elevation taken from the opposite side of Fig. 1. Figs. 5 and 6 are enlarged detailed views disclosing more fully the standard and beam connection and the landside adjustment, respectively.

In carrying out my invention I employ the stock or standard A, the beam or draft-bar B, the handles C, and the plow D, all substantially in their general outlines of the construction as shown, or they may be of any approved construction.

E is a regulating bar or shoe of substantially the construction shown, with a preferably boss-like pivot or stud $a$ on one side, near one end, adapted to bear and turn in a corresponding cavity or recess $a'$ in a short stud or projection $b$ of the landside at the lower end of the standard or stock A. The bar or shoe E has an aperture or slot $c$ through it coincidently or opposite a slightly-arcuate slot $d$ in the stud or projection $b$, and through these slots passes an adjusting nutted bolt $e$ to provide for the angular adjustment of said shoe and its retention at the point or angle of such adjustment according to the amount of declination it is desired to give the plow-point, as will be readily appreciated, in varying the extent or degree of its penetration into the soil as may be required. The shoe E has upon its inner side a tooth or detent $e'$, adapted to engage any one of a series of notches or grooves $e^2$ in the projection $b$ in rear of the arcuate slot $d$ to facilitate and predetermine the amount of adjustment it may be desired to impart to said shoe.

F is an angular casting or bracket with its upper offset end adapted to engage or catch upon the beam or draft-bar B and its lower vertical portion or leg interposed between said beam and the forwardly-extending portion of the standard or stock A, said lower vertical portion of bracket also being received into a recess or socket $f$ in said forwardly-extending portion of the standard, and through a slot $f'$ in the last-named portion and a hole $f^2$ in said bracket is passed a bolt $g$ to effect connection between and hold said parts together. The bracket or casting F has upon one side a ratchet-surface or teeth $f^3$, adapted to engage a corresponding ratchet-surface or teeth $f^4$ on the side of the standard A. This arrangement permits of the adjustment of the plow-beam by suitably manipulating the respective parts to retain it normally or level, according to the declination given the plow-point.

The rearwardly-extending portion A' of the stock or standard A has a vertical lug G, having a hole $g'$ therein, to which is pivoted the rear end of the beam or draft-bar B by a bolt $g^2$.

In lieu of the plow-point shown in full lines in Fig. 3 a scraper-blade may be substituted, as shown in dotted lines.

This invention is characteristic of great simplicity of construction, cheaply manufactured, and facilitates the handling of the plow.

Having thus fully described my invention, what I claim as new, and desire to secure by Letters Patent, is—

1. The combination in a plow of the character described, of the bracket or angular casting adapted to catch upon the plow-beam and let into a recess or socket in the side of the forward end of the standard or stock, and a bolt effecting connection between said parts, said casting or bracket having a ratchet-surface or teeth adapted to engage a corresponding ratchet-surface or teeth on the inside of said standard, juxtaposed with said socket, substantially as set forth.

2. The combination in a plow of the character described of a stock having a rearwardly-extended arm provided with a perforated lug with a beam having a fixed pivot or stud engaging the perforations of said lug, substantially as set forth.

3. The combination in a plow of the character described, of a stock having a rearwardly-extended arm provided with a perforated lug to which is pivoted a beam with an angular bracket or casting adapted to be adjusted vertically within a recess or socket in the forwardly-extended arm of the stock to provide for the raising and lowering of the beam, substantially as set forth.

In testimony whereof I affix my signature in presence of two witnesses.

B. P. HATCHELL.

Witnesses:
MORVEN THOMPSON,
EDWIN B. H. TOWERS, Jr.